Dec. 9, 1941.　　　　K. CLARK　　　　2,265,225

MEANS AND METHOD FOR PURIFYING LIQUIDS

Filed May 18, 1938　　　2 Sheets-Sheet 1

INVENTOR.
Kendall Clark
BY F. Bascom Smith
ATTORNEY.

Dec. 9, 1941.   K. CLARK   2,265,225
MEANS AND METHOD FOR PURIFYING LIQUIDS
Filed May 18, 1938   2 Sheets-Sheet 2
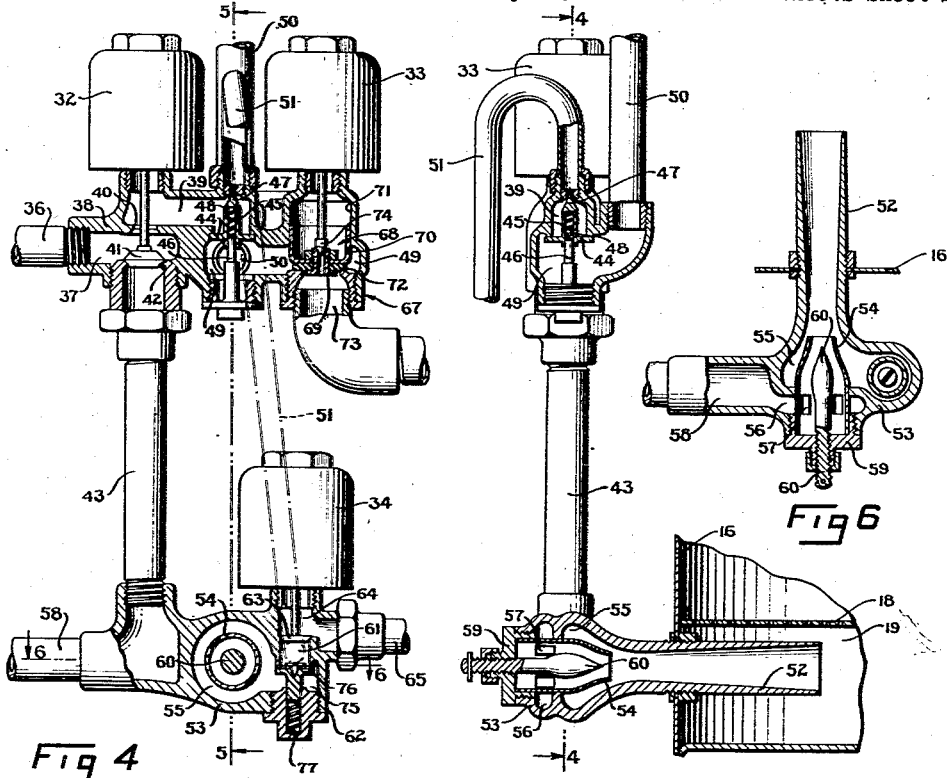
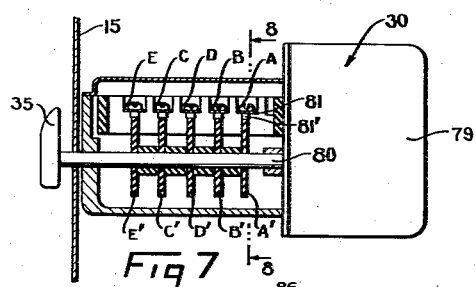
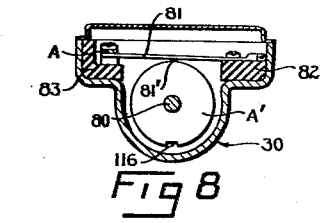
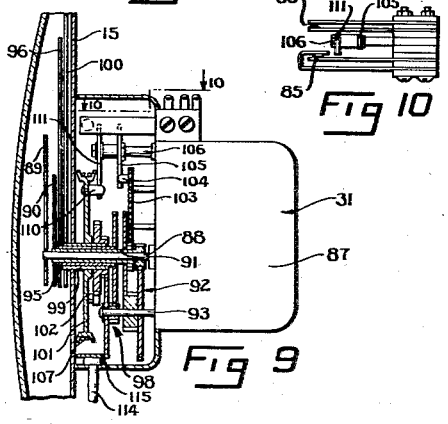
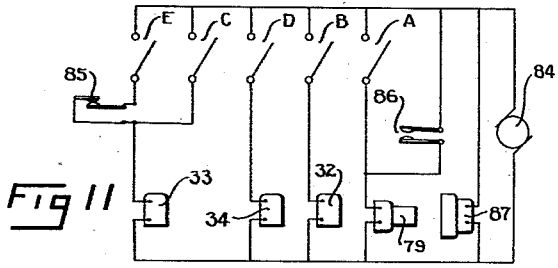
INVENTOR.
Kendall Clark
BY
F. Bascom Smith
ATTORNEY.

Patented Dec. 9, 1941

2,265,225

UNITED STATES PATENT OFFICE 2,265,225

MEANS AND METHOD FOR PURIFYING LIQUIDS

Kendall Clark, South Bend, Ind., assignor to Milner Corporation, New York, N. Y., a corporation of New York Application May 18, 1938, Serial No. 208,518

9 Claims. (Cl. 210—24)

This invention relates to liquid purification and more particularly to apparatus and methods for softening water or the like and to means for controlling the operation of said apparatus.

One of the objects of the present invention is to provide regenerative water softening apparatus embodying novel means whereby the amount of regenerating material which is passed through the softener during each regeneration cycle is controlled in a novel manner.

Another object of the invention is to provide novel water softening means and a novel method for controlling said means whereby the quantity of regenerating material employed for each regeneration cycle is controlled in accordance with the extent to which the softening capacity of the softening material is exhausted during the preceding softening period.

Still another object is to provide novel means for controlling the flow of water and regenerating material in the flow system of a water softener or similar apparatus.

A further object is to provide novel means for controlling the flow of water to the brine reservoir of a zeolite water softener in accordance with the flow of water through the zeolite bed during the softening cycle.

A still further object is to provide novel apparatus whereby the softening capacity of the zeolite or other softening material and the salt content of the brine tank may be continuously indicated.

Another object is to provide novel and simplified means in the flow system of liquid purifying apparatus or the like whereby a predetermined proportion of the liquid flowing through a portion of said system may be diverted therefrom.

Another object is to provide a water softener of the fully or semi-automatic type which is suitable for either domestic or commercial use and which is more simple in construction and operation, more inexpensive to manufacture, and more economical, efficient, and dependable in operation than similar softeners heretofore provided.

Another object is to provide a novel softener which is so constructed that a proper amount of regenerating material for regeneration of the mineral bed is always available and is automatically supplied to said bed in accordance with novel control means to prevent excessive exhaustion of the softening capacity of the latter.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a front elevation of one form of water softener embodying the present invention;

Fig. 4 is an enlarged detail view, partly in section and with parts broken away, of the valve and injector mechanisms employed in carrying out the present invention, the section being taken substantially on lines 4—4 of Figs. 3 and 5;

Fig. 5 is a similar view with the section being taken substantially on line 5—5 of Fig. 4;

Fig. 6 is a detail sectional view taken substantially on line 6—6 of Fig. 4;

Fig. 7 is an enlarged detail view, partly in section, of a portion of the electrical control system employed in carrying out the invention;

Fig. 8 is a detail sectional view, taken substantially on line 8—8 of Fig. 7;

Fig. 9 is a detail view, partly in section and with parts broken away, of a unit including the indicating mechanism and a portion of the control mechanism;

Fig. 10 is a detail view of the switch mechanism of Fig. 9 as viewed along line 10—10 of said figure; and, Fig. 11 is a wiring diagram for the electrical control system employed in the softener shown in Figs. 2 and 3.

Figure 1:
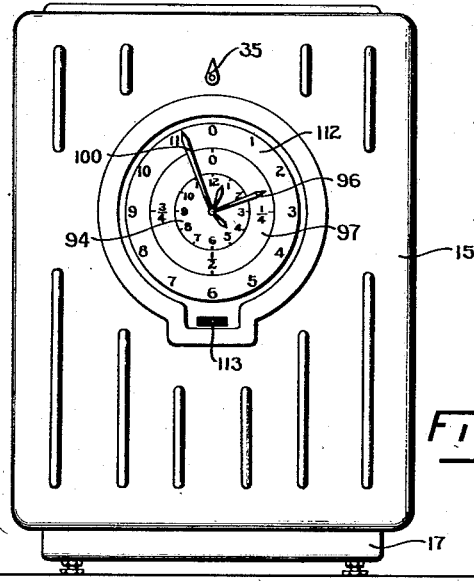

One embodiment of the present invention is illustrated in the drawings, by way of example, in the form of a zeolite water softener which is adapted for household use and comprises a tank or container for softening material, such as zeolite, a tank or container for regenerating material, such as brine, a system of conduits for directing the flow of water and regenerating fluid to and from said tanks in a novel manner, automatically operable means for controlling said flow, and means for indicating conditions existing in the softening apparatus. All of these parts are neatly and compactly housed in a comparatively small cabinet or casing 15. The novel flow controlled means comprises a plurality of automatic valves, such as solenoid valves, which are rendered operable in accordance with the flow of liquid in the flow system or by suitable clock means to direct hard water through the softener tank to a point of use and into the brine tank in predetermined proportionate amounts during the softening period and to direct hard water and brine through the softener tank to accomplish back-washing, regeneration and rinsing of the softening material during the reconditioning cycle, hard water being supplied to the service mains during the latter cycle. The reconditioning cycle may be initiated either at predetermined times by a time clock, at any time by hand, or automatically whenever the softening material is exhausted to a predetermined degree, as determined by the quantity of brine available in the brine tank. By supplying water to the brine tank in an amount proportional to the amount of water passing through the softener tank, taking into consideration the hardness of the water in determining said amount, the proper amount of brine for regenerating the softening material is always available independently of how or when the reconditioning cycle is initiated. The indicating means which may be mounted in the front of casing 15 may indicate the softening capacity of the softening material and the approximate quantity of salt in the brine tank at all times.

Figures 2, 3:
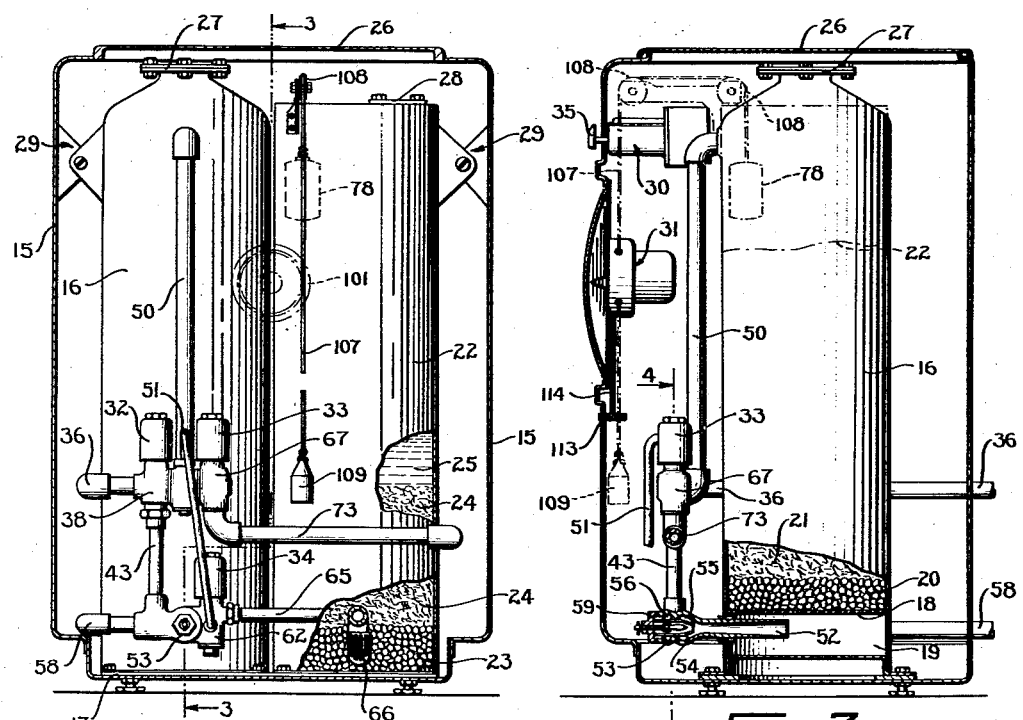
Fig. 2 is a similar view on a somewhat larger scale with parts broken away and with parts of the casing and control means removed.
Fig. 3 is a side elevation, partly in section and with parts broken away, the section being taken substantially on line 3—3 of Fig. 2 with parts of the salt tank and float system being shown in broken lines.

Referring more particularly to Figs. 1 to 3, the apparatus illustrated comprises a softener tank 16 which is secured to a base 17 that forms a part of casing 15 and said tank preferably has a perforated screen or grill 18 mounted therein a few inches from the bottom to form a chamber 19. Above screen 18 and supported thereby is a layer of gravel 20 and a bed of water softening material 21, such as zeolite, for example, above the gravel (Fig. 3). Also secured to base 17 adjacent tank 16 is a second tank 22 preferably provided with a layer of gravel 23 in the bottom thereof, said gravel being surmounted by a bed of regenerating material 24, such as rock salt, and a quantity of brine 25. Casing 15 is provided with a cover 26 to render tanks 16 and 22 readily accessible, and said tanks have removable covers 27 and 28, respectively, whereby the zeolite and salt content thereof may be replaced or replenished. If desired, the upper portion of casing 15 may be secured to tanks 16 and 22 by means of suitable brackets 29.

As pointed out above, housing or casing 15 not only serves to house tanks 16 and 22 and to thus enhance the appearance of the apparatus but also constitutes a housing for the flow system and control means for said system. The control means includes an electric switch unit 30 and a mechanism 31 (Fig. 3) which includes indicating means and parts of the electrical control system, all of which will be hereinafter fully described. In the interest of clarity, the electrical connections between unit 30, mechanism 31, and solenoids 32, 33, and 34 which are provided for operating the flow control valves are not shown in Figs. 2 and 3. Suitable dials and hands operated by the indicating mechanism 31 are mounted substantially in the center of the front panel of casing 15 and an element 35 for manually actuating switch means in unit 30, for a purpose to appear hereinafter, projects from the front of casing 15 immediately above said dials.

During the interval commonly known as the softening period, which may be of any desired duration up to four or six days, hard water is supplied to softener tank 16 and thence to a point of use from a supply pipe 36. The hard water flows from the supply pipe into a central chamber 37 (Fig. 4) of a valve body 38 and thence into a chamber 39 in said body through a passage 40 controlled by a double-faced valve 41 which is normally held in a position to close a second passage 42 by gravity or suitable resilient means (not shown). The stem of valve 41 is associated with solenoid 32 which, when energized, is adapted to lift said valve to close passage 40 and open passage 42 in order to permit the flow of water into a conduit 43 for a purpose to appear hereinafter.

Novel valve means are provided for controlling the flow of hard water from chamber 39, said valve means being adapted to divert a small predetermined percentage of the water into brine tank 22 and direct the remainder or major portion thereof into the top of softener tank 16. In the illustrated embodiment, said valve means, which may be conveniently called a bleeder by-pass valve, comprises a valve 44 having a hollow stem 45 into the lower end of which a stationary guide pin 46 slidably extends. A needle valve 47 which constitutes a part of the above-mentioned novel means is secured to and closes the upper end of stem 45 and a spring 48 is interposed between the lower end of said needle valve and the upper end of guide pin 46 for normally and yieldingly holding valves 44 and 47 in closed position. When said valves are simultaneously forced off their seats against the effort of spring 48, by the pressure of water in chamber 39 acting upon the upper surface of valve 44, water flows from said chamber past the latter valve into a chamber 49 and thence through a conduit 50 into the top of softener tank 16. At the same time, water in an amount proportional to that flowing past valve 44 flows past needle valve 47 into a conduit 51 and thence into salt tank 22 in a manner to be hereinafter described. For a purpose which will also appear hereinafter, the ratio of the water flowing through valve 47 to that flowing through valve 44 may be accurately controlled by properly selecting the size and shape of the needle valve and the pressure of spring 48.

The hard water which enters the top of tank 16 from conduit 50 passes down through zeolite bed 21 or other softening agent in the tank. The zeolite softens the water and serves as a filter to remove solid impurities therefrom. After passing through bed 21 and gravel 20, the softened, purified water enters chamber 19 and flows out through a conduit 52 which constitutes a Venturi tube adapted to cooperate with an ejector housed in a body 53 that is integral with the outer end of said conduit. Extending axially of Venturi tube 52 into body 53 is a tubular member 54, the inner conical end of which is adjacent the neck or restricted area of said tube is surrounded by an enlarged annular chamber 55 (Fig. 5). An annular chamber 56 is also formed in body 53 intermediate the ends of member 54 and is in constant communication with the interior of said member through a plurality of openings 57 and with a service conduit 58 which carries softened water to any desired point of use. The outer end of tubular member 54 is held in place and is closed by a flange nut 59 which supports a spindle 60 that is adapted to restrict and hence increase the velocity of the flow from member 54. Spindle 60 has threaded engagement with nut 59 and may accordingly be adjusted axially of member 54.

It will thus be seen that softened water from chamber 19 may flow through Venturi tube 52 into member 54 and out through openings 57 into annular chamber 56 and service conduit 58.

During the flow of water through the softening tank and to a point of use in the above manner, an amount of water proportional to the softened water flows past bleeder valve 47, through conduit 51 into a central chamber 61 of valve body 62 (Fig. 4) and thence past a magnetically operated check valve 63 into a second chamber 64 which is in direct communication with the bottom of brine tank 22 through a conduit 65. Valve 63 is normally held in closed position by gravity or suitable resilient means (not shown) and is lifted off its seat during the softening operation to permit flow from chamber 61 to chamber 64 by the hydraulic pressure differential existing between said chambers. When flow in the reverse direction is desired, such as during the regeneration cycle to be hereinafter described, valve 63 may be lifted off its seat by energizing solenoid 34. The inner end of conduit 65 is preferably provided with a suitable strainer 66 (Fig. 2) which is surrounded by gravel bed 23. The water thus injected into the bottom of tank 22 passes upwardly into and through salt bed 24 and is thus converted into brine which constitutes a regenerating solution for zeolite bed 21.

As is well understood in the art, the degeneration or exhaustion of the softening capacity of the zeolite in a water softener is dependent upon the amount and hardness of the water which passes therethrough. Also, the amount of brine which is necessary to regenerate the zeolite is determined by the degree of exhaustion of the softening capacity of the latter. Accordingly, by properly proportioning bleeder by-pass valve 44, 47, there is always available in tank 22 a sufficient and correct amount of brine to fully regenerate zeolite 21. Full regeneration of the zeolite without any waste of brine is thus insured independently of when the reconditioning cycle is initiated.

In addition to losing its softening qualities during the softening period, zeolite 21 is compacted and, because of its filter action, becomes loaded with solid impurities carried in by hard water. In order to loosen the zeolite bed and wash the impurities therefrom before regeneration, the bed is preferably back-washed by passing water upwardly therethrough at high velocity. The flow of water for backwashing is initiated by energizing solenoids 32 and 33 in a manner and by means to be hereinafter described in detail. Energization of solenoid 32 is effective to lift valve 41, thereby closing passage 40 and opening passage 42 in valve body 38. Solenoid 33 is associated with a drain valve which is housed in a body 67 and will be next described. Solenoid 32 is preferably energized an instant before solenoid 33 in order that valve 41 may be lifted by the former prior to the opening of the drain valve by the latter and hence while the difference between the hydraulic pressures acting on the opposite faces of valve 41 is comparatively small.

Said drain valve comprises a pressure actuated relay valve 68 (Fig. 4) which includes a tubular stem 69 having an external flange at the lower end thereof and a guide member 70 having a loose sliding fit in a tubular portion 71 of body 67 above chamber 49 and being provided with an internal flange that engages the outer periphery of stem 69. Interposed and securely clamped between the flanges on members 69 and 70 by a suitable nut threadedly engaging stem 69 is a fiber washer 72 or the like. Said washer has a diameter slightly less than the diameter of guide member 70 but larger than the flange on stem member 69 and is adapted to engage a seat around an opening which connects chamber 49 with a drain conduit 73 which is at a lower hydraulic pressure than chambers 49 and 71. The upper end of stem 69 constitutes a seat for a pilot valve 74 which is adapted to be actuated by solenoid 33. Thus, when the latter is energized and lifts pilot valve 74, water trapped in chamber 71 flows through stem 69 into conduit 73, thereby permitting the fluid pressure in chamber 49 to lift valve 68 and establish communication between chamber 49 and drain pipe 73. Valves 68 and 74 are normally held in closed position by common resilient means (not shown) or by gravity and the hydraulic pressure differential between chambers 71, 49, and 73. Accordingly, when solenoids 32 and 33 are energized, hard water flows from pipe 36 through valve body 38, conduit 43, chamber 56, member 54, and Venturi tube 52 into the bottom of softener tank 16. The water then flows upwardly through gravel 20 and zeolite bed 21, loosening and cleaning the same, and thence through conduit 50 and chamber 49 into drain pipe 73. At the beginning of the backwashing period, valve 63 in valve body 62 is permitted to close by deenergization of solenoid 34.

After backwashing the zeolite bed for a predetermined interval determined by the novel control means to be hereinafter described, brine 25 is ejected from tank 22 and passed upwardly through tank 16 to regenerate zeolite 21. The regenerating period is initiated by reenergization of solenoid 34 to open valve 63 while continuing the flow of hard water the same as during the backwashing period above described. Hard water flowing from tubular member 54 in ejector housing 53 into the neck of Venturi tube 52 at high velocity creates a low pressure in annular chamber 55 which is in constant communication with a chamber 75 in the bottom of valve body 62 (Fig. 4). Communication between chambers 75 and 61 in said body and hence between chamber 75 and salt tank 22 when valve 63 is in open position is controlled by a one-way valve 76 which is normally held in closed position by any suitable means such as a coil spring 77 and also by the hydraulic pressure differential. The suction created in chambers 55 and 75 by the ejector action above described is effective to pull valve 76 off its seat and withdraw brine from tank 22 through conduit 65 and chambers 64 and 61. The brine flowing into chamber 55 is entrained by the hard water flowing out of tubular member 54 and injected into the bottom of softener tank 16. The brine solution then passes upwardly through zeolite bed 21 and thence to the drain through conduit 50, chambers 59, and drain pipe 73.

It has been found desirable to stop the flow of brine during the major portion of the regenerating period and permit the zeolite to set in the stationary brine for reaction therewith. Accordingly, when the correct quantity of brine has been injected into the softener tank, i. e., when the brine in tank 22 reaches a predetermined low level, control means, to be hereinafter described are actuated by a float 78 in the brine tank (Fig. 3) to deenergize solenoid 33 and hence permit drain valve 68 to close. While valve 68 is closed and the brine is reacting with the zeolite in tank

16, solenoid 34 may be deenergized to permit valve 63 to close in preparation for the rinsing period which will be next described.

After a predetermined time interval beginning with the commencement of the reconditioning cycle, solenoid 33 is again energized, thereby causing valve 68 to be opened and permitting hard water to flow in the same manner as during the backwash period, i. e., into the bottom of softener tank 16 up through the zeolite and out through conduit 50 to the drain 73. All of the brine is thus rinsed from the softening material and discharged to the drain. When the zeolite has been thoroughly rinsed, preferably after a predetermined time interval, solenoids 32 and 33 are deenergized and solenoid 34 is reenergized to thereby return the elements of the flow system to their normal positions for directing the flow to cause softened water to be delivered to service main 58 in the manner first above described.

A novel simplified electrical control system is provided for controlling the flow of electric current to the coils of valve actuating solenoids 32, 33, and 34 during the softening period and reconditioning cycle to effect the novel method of operation heretofore described. Said control system includes switch unit 30 (Figs. 3 and 7) which comprises a small constant speed electric motor 79 having a shaft 80 on which five cams made of insulating material are mounted in spaced relation for rotation therewith. Motor 79 is energized only during the reconditioning cycle and is designed to rotate shaft 80 through one revolution during said cycle which is preferably of about one hour's duration. Each of the cams on shaft 80 is adapted to close a switch one or more times during each revolution thereof. Each of said switches comprises a resilient conducting arm 81 (Fig. 8) mounted at one end on an insulating block 82 and having a depending lug 81 adapted to yieldingly engage a cam. Each of the arms 81 carries a contact adapted to engage a stationary contact mounted on a bar of insulating material 83. For convenience, the five switches of unit 30 are designated A, B, C, D, and E, and the cam actuators therefor are designated A', B', C', D', and E', respectively. When the raised portion of cam A', for example, engages arm 81, the contacts of switch A are moved into engagement.

As best seen in the wiring diagram of Fig. 11, switches A, B, C, and D are connected in series with clock 79 and solenoids 32, 33, and 34, respectively, and said series circuits are connected in parallel with each other across the terminals of a suitable source of electrical energy, such as generator 84. Switch E is connected in series with a normally closed switch 85 and this series circuit is connected in parallel with switch C for controlling the energization and deenergization of solenoid 33. A normally open switch 86 which is mounted in unit 31 with switch 85 is connected in parallel with cam actuated switch A. It will be seen from the wiring diagram that motor 79 may be energized to rotate shaft 80 by the closure of switch 86. Shortly after shaft 80 starts to rotate, cam A' is effective to close switch A and maintain the circuit to motor 79 closed during the entire reconditioning cycle independently of switch 86 which is permitted to open at some time during said cycle. The remaining cams B' to E' are also rotated and become effective to open and close switches B to E, respectively, after predetermined time intervals to energize and deenergize solenoids 32, 33, and 34 in the desired sequence to carry out the operations heretofore described.

The mechanism designated 31 (Figs. 3 and 9) forms a part of the control mechanism and includes means for indicating certain conditions in the softener apparatus. Said mechanism, in the form shown, comprises an electric clock 87 which is connected at all times across the terminals of source 84 (Fig. 11) and is adapted to rotate a shaft 88 at a speed of one revolution per hour. A minute hand 89 is mounted on the outer end of shaft 88 and an hour hand 90 is secured to the outer end of a sleeve 91 which is freely mounted on shaft 88 and is rotated thereby at a speed of one revolution every twelve hours by means of reduction gearing 92, of which two intermediate gears are freely mounted on a stub shaft 93. Hands 89 and 90 are thus adapted to indicate the time of day at all times on a conventional clock dial 94 (Fig. 1).

Loosely mounted on sleeve 91 is a second sleeve 95 on the outer end of which a hand 96 adapted to indicate, in conjunction with a dial 97 (Fig. 1), the quantity of undissolved salt in tank 22. The inner end of sleeve 95 is operatively connected through reduction gearing 98 with a third freely rotatable sleeve 99 which carries a hand 100. A windlass or pulley 101 is mounted on sleeve 99 and is connected thereto by means of any suitable type of one-way driving connection, such as a pawl and ratchet mechanism 102. Said one-way driving connection is so designed that sleeve 99 will be driven by pulley 101 in a clockwise direction, as viewed from the left in Fig. 9 and remain stationary when said pulley is moved in a counter-clockwise direction. Driving connections of this type are old and well known in the art and do not, per se, constitute any part of the present invention. It is accordingly believed to be unnecessary to illustrate and describe the same in detail.

It is normally desirable to initiate the reconditioning cycle of a zeolite water softener about once every four or six days, for example, in the early morning hours when little, if any, water is desired for use. The reconditioning cycle is accordingly preferably initiated under normal circumstances by a time clock 87 and, for this purpose, means are provided whereby switch 86 may be closed at predetermined intervals by said clock. Said means, as shown in the illustrated embodiment, comprises a reduction gear train, the ultimate gear 103 of which is adapted to be rotated by clock 87 through one revolution every few days, the time depending upon the quantity of water normally consumed. Gear 103 carries an axially extending lug 104 which is adapted to engage an arm 105 that is pivoted on a stationary shaft 106. When the lower end of arm 105 is engaged by lug 104, the upper end of the former is adapted to engage one of the flexible arms of switch 86 and move the contacts of said switch into engagement. A circuit is thus closed to motor 79 and the reconditioning cycle is started.

In the event that a quantity of water in excess of that normally consumed passes through the softener, it may become necessary to commence the reconditioning cycle before the same would ordinarily be started by clock 87, since it is detrimental to completely exhaust the softening capacity of the zeolite. In order to insure regeneration after a predetermined maximum quantity of water has passed through softening tank 16, means controlled by the brine level in tank 22, which level, as pointed out above, is proportional to and constitutes a measure of the quantity of water flowing to the softening tank, are provided for closing switch 86. Said means includes float 78 (Fig. 2) which is supported by a cord 107 which passes over pulleys 108 and around windlass 101. A counterweight 109 is secured to the free end of cord 107 for turning the windlass when float 78 is lifted by brine 25. It will thus be seen that, upon the raising and lowering of float 78, windlass 101 will be rotated in clockwise and counter-clockwise directions, respectively, as viewed in Fig. 2.

Windlass 101 is provided with a laterally projecting lug 110 which is adapted to engage an arm 111 pivoted on shaft 106. When the windlass is rotated in a clockwise direction by a rising level in tank 22, lug 110 is effective to pivot arm 111 so that the upper end of the latter closes switch 86 to initiate the reconditioning cycle. The parts are so set that this action takes place when the level in brine tank 22 reaches a predetermined high. When the windlass is rotated in a counter-clockwise direction by reason of a falling level in tank 22, as during the regenerating period, lug 110 is effective to pivot arm 111 in the other direction and effect the opening of normally closed switch 85. This latter action takes place when the brine level reaches a predetermined low and is effective to open the circuit to solenoid 33 so that valve 68 may close and stop the flow of brine in the softener tank for reasons heretofore pointed out.

If for any reason it should become necessary or desirable to initiate the reconditioning cycle at any other time, the same may be initiated by manually turning knob 35 a small amount in a clockwise direction. Actuation of said knob rotates cam A' sufficiently to close switch A and hence energize motor 79.

Since windlass 101 and, hence, indicator hand 100 are actuated in accordance with the level in brine tank 22 and since this level is a measure of the condition or instantaneous softening capacity of zeolite 21, it will be seen that hand 100 may be employed in conjunction with a dial 112 (Fig. 1) to indicate the remaining softening capacity of the zeolite.

The salt which is dissolved in the brine solution in tank 22 is approximately proportional to the amount of brine removed therefrom. Since hand 100 moves in a clockwise direction in an amount measured by the water entering the tank 22 during each softening period and leaving later in the form of brine, and since the clockwise movement of hand 96 is, by reason of connection 102, the sum of similar movements of hand 100, the quantity of salt remaining in tank 22 may be indicated on dial 97 by hand 96. When the salt supply is replenished by filling tank 22 through opening 28, hand 96 may be reset by turning a knob 113 which is operatively connected by means of a shaft 114 and gear 115 to gear train 98.

It is now desirable to trace the flow of water and regenerating solution in conjunction with the operation of the flow control means during the softening period and the various steps of the reconditioning cycle. The operation is as follows:

Softening

During the softening period, the circuit to motor 79 is open, cams B', C', D' and E' are in position to permit the opening of switches B, C, D, and E and hence the opening of circuits to solenoids 32, 33 and 34. The various valves of the flow control system accordingly assume the positions in which the same are illustrated in the drawings during the softening period. When water is drawn from service main 58 for use, a pressure differential is established on the faces of valve 44 and the pressure of the hard water flowing from pipe 36 through valve body 38 into chamber 39 is effective to simultaneously open valves 44 and 47. As heretofore fully pointed out, a predetermined proportion of the incoming hard water now flows past valve 44 into chamber 49 and through conduit 50, tank 16 where it is softened by zeolite 21, chamber 19, Venturi tube 52, member 54, annular chamber 56, and conduit 58 to the desired point of use as soft water.

Backwashing

At a predetermined time, or when a predetermined amount of water has flowed through softener tank 16, switch 86 is closed either by actuation of arm 105 by clock 87 or of arm 111 by float-operated windlass 101. Upon the closure of switch 86, motor 79 is energized and starts to rotate cams A' to E', inclusive. A slight rotation of cam A', which is provided with only a short notch 116 (Fig. 8) for receiving lug 81', is effective to close holding switch A for maintaining the circuit to motor 79 closed during substantially a complete revolution of motor shaft 80. Switches B and E are also closed in succession, if desired, by their respective cams to thereby successively close the circuits to solenoids 32 and 33. Solenoid 32 thus becomes effective to lift by-pass valve 41 to close passage 40 and open passage 42, while solenoid 33 lifts valve 74 and thereby releases drain valve 68 for movement to open position. Hard water is thus directed from pipe 36 through valve body 38, conduit 43 (service main 58, if any is required), chamber 56, member 54, Venturi tube 52, and into the bottom of softener tank 16. The water then passes upwardly through zeolite bed 21, loosening and cleansing the same, and out through conduit 50, valve chamber 49, drain valve 68 which is lifted by the pressure of the water, and into drain pipe 73.

Regeneration

After a predetermined time interval of sufficient duration to insure loosening and cleansing of the zeolite bed, cam D', which is being continuously rotated by motor 79, closes switch D to thereby energize solenoid 34 for opening valve 63. The flow of hard water continues during the regeneration period in the same manner as during the backwashing period. Flow of this water through ejector 54, 52 is effective to create a suction in chamber 55, 75 which is sufficient to open valve 76 against the pressure of spring 77 and withdraw brine from tank 22 through conduit 65 and valve chambers 64 and 61. The brine is entrained by the hard water passing from member 54 into venturi 52 at high velocity and is carried into the bottom of tank 16 and upwardly through zeolite bed 21. When the correct amount of brine has been injected into tank 16 to fully regenerate the softening agent, that is, when the brine in tank 22 reaches a predetermined low level, switch 85 is closed by the operation of float-controlled windlass 101 in a manner heretofore fully described. The circuit to solenoid 33 which was closed through switch E is thus opened at switch 85 so that drain valve 68 will be held in closed position by pilot valve 74. Flow through the zeolite is thus stopped and the brine in tank 16 is permitted to react with the zeolite for a substantial interval.

*Rinsing*

After a regenerating period of predetermined duration, cam C' becomes effective to close switch C and hence the circuit to drain valve solenoid 33, and cam D' permits switch D to open the circuit to brine valve solenoid 34 and hence permit the closure of valve 63. Drain valve 68 is accordingly opened by the water pressure in chamber 49 and water is again permitted to flow in the same manner as during the backwashing period. The water now flowing is effective to wash the brine solution from the zeolite bed 21 and discharge the same through drain pipe 73. After a predetermined rinsing interval, cams A', B', C', and E' permit switches A, B, C, and E, respectively, to open to thereby deenergize clock 79 and solenoids 32 and 33. The various valves are thus returned to the illustrated positions and softening is resumed.

It will be seen that hard water is available at all points of use during each step of the reconditioning cycle, since supply pipe 36 and service pipe 58 are in constant communication through conduit 43 during the progress of said cycle. In one embodiment of the invention, the reconditioning cycle consumes about one hour. Of this time, about thirteen minutes are employed for backwashing the zeolite, about two are consumed in injecting the brine into the softener tank, the brine is allowed to set in the zeolite for about thirty minutes, and the remaining fifteen minutes constitute the rinse period.

There is thus provided a water softener embodying novel control means for effecting a novel method of operation in water softening apparatus. The softening apparatus and control means provided comprise a comparatively small number of simple parts which may be readily and inexpensively manufactured and housed in a small cabinet having a pleasing appearance. The invention comprehends novel means whereby the danger of overexhausting the softening agent in a zeolite water softener is eliminated and novel means and method which obviate any waste of regenerating solution. The correct amount of brine for regenerating the zeolite is always available and only the correct amount is employed during each regenerating period. Novel means are also provided for indicating the condition of the softening agent and the quantity of regenerating material remaining in the apparatus.

Although only a single embodiment of the invention has been illustrated and described in detail, it is to be expressly understood that the same is not limited thereto. For example, other types of switch mechanism may be satisfactorily used and some or all of the various solenoid actuated valves may be designed to be held in closed instead of open position when the solenoid actuators therefor are energized. Various other changes may also be made in the design and arrangement of parts illustrated without departing from the spirit and scope of the invention. For a definition of the limits of the invention, reference is had primarily to the appended claims.

What is claimed is:

1. In water softening apparatus, the combination with a tank for water softening material and a container for regenerating material of means for directing the flow of water to be softened from a source of supply to said tank, and valve means operatively connected to said source of supply, said tank and container for simultaneously directing water to said container in an amount proportional to the amount of water flowing to said tank, said valve means comprising a disc valve and a needle valve rigidly secured to each other.

2. The method of operating a water softener comprising a softener tank and a container for regenerating material which includes directing the water through said tank to service, simultaneously directing water to said container in an amount bearing approximately a predetermined proportion to the amount of water directed through said tank, reversing the flow of water through said tank and directing the same to a drain when the fluid level in said container reaches a predetermined maximum, injecting regenerating fluid from said container into said tank, and interrupting all flow through said tank for a substantial interval when the fluid in said container reaches a predetermined low level.

3. The method of operating a water softener comprising a softener tank and a container for regenerating material which includes directing water through said softener tank to service, simultaneously directing water to said container in an amount bearing approximately a predetermined proportion to the amount of water directed through said tank, reversing the flow of water through said tank and directing the same to a drain when the fluid level in said container reaches a predetermined maximum, injecting regenerating fluid from said container into said tank, interrupting flow through said tank when the fluid in said container reaches a predetermined low level, retaining said fluid in said tank for a substantial interval, and subsequently rinsing said fluid from said tank.

4. The method of operating water softening apparatus comprising a tank for a water softening agent and a container for regenerating material which includes simultaneously directing water through said tank and to said container in predetermined proportional amounts whenever softened water is withdrawn from said tank, interrupting the flow of water to said container when the fluid level in said container reaches a predetermined maximum, injecting fluid from said container into said tank, and interrupting flow through said tank when the fluid in said container reaches a predetermined low level.

5. In apparatus of the class described, a softener tank, a container for regenerating material, means for simultaneously directing the flow of water to said tank and container in predetermined proportional amounts whenever softened water is withdrawn from said tank, means for simultaneously interrupting the flow to said container and reversing the flow through said tank, means for rendering said last-named means operative when the liquid in said container reaches a predetermined high level, means for directing the flow of liquid from said container to said tank, and means for interrupting said flow of said liquid when the level thereof in said container reaches a predetermined low.

6. In apparatus of the class described, a drain, a softener tank having a connection to said drain, a container for regenerating solution, means for directing the flow of said solution from said container and through said tank to said drain, and means controlled by the liquid level in said container for interrupting the flow from said tank to said drain when the level of said solution in said container reaches a predetermined low.

7. The method of operating a water softener comprising a tank for water softening material and a container for regenerating material which includes directing water through said tank to a point of use, directing water to said container only when water to be softened is directed through said tank in an amount proportional to the amount of water directed through said tank to be softened, reversing the flow of water through said tank and directing the same to a drain at predetermined time intervals, injecting regenerating fluid from said container into said tank, and interrupting all flow through said tank for a substantial interval when the fluid in said container reaches a predetermined low level.

8. In water softening apparatus, a tank for water softening material, a container for a solution adapted to regenerate said material, means for filling said container, a flow system including a plurality of valves, means for actuating said valves to direct fluid flow from a source of water supply and said container through said tank to recondition said water softening material, and control means for said actuating means including means responsive to the liquid level in said container for initiating the reconditioning of said material.

9. In water softening apparatus, a tank for water softening material, a container for a solution adapted to regenerate said material, means for filling said container, a flow system including a plurality of valves, means for actuating said valves to direct fluid flow from a source of water supply and said container through said tank to recondition said water softening material, and control means for said actuating means including means responsive to the liquid level in said container for interrupting all flow through said tank for a substantial interval during the reconditioning of said material.

KENDALL CLARK.